(12) United States Patent
Bamford (10) Patent No.: US 11,137,794 B2
(45) Date of Patent: Oct. 5, 2021

(54) SYSTEMS AND METHODS FOR SYNCHRONIZATION OF MULTIPLE PROCESSORS

(71) Applicant: Woodward, Inc., Fort Collins, CO (US)

(72) Inventor: James Bamford, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 67 days.

(21) Appl. No.: 16/735,039

(22) Filed: Jan. 6, 2020

(65) Prior Publication Data

US 2021/0208622 A1    Jul. 8, 2021

(51) Int. Cl.
*G06F 1/12* (2006.01)
*G06F 1/08* (2006.01)

(52) U.S. Cl.
CPC . *G06F 1/12* (2013.01); *G06F 1/08* (2013.01)

(58) Field of Classification Search
CPC ..... G06F 1/12; G06F 1/08; G06F 1/04; G06F 1/06; G06F 1/10; G06F 15/163
See application file for complete search history.

(56) References Cited

U.S. PATENT DOCUMENTS

| 7,340,630 B2 | 3/2008 | Morris et al. |
| 2002/0019951 A1* | 2/2002 | Kubo ........................ G06F 1/14 713/400 |
| 2003/0103486 A1 | 6/2003 | Salt et al. |
| 2011/0119475 A1 | 5/2011 | Chen et al. |
| 2014/0337857 A1 | 11/2014 | Kottapalli et al. |
| 2019/0013748 A1 | 1/2019 | Barrenscheen et al. |
| 2020/0228704 A1* | 7/2020 | Ito ....................... H04N 5/23293 |
| 2021/0063989 A1* | 3/2021 | Taniguchi .............. G05B 19/05 |

OTHER PUBLICATIONS

Int'l Search Report and Written Opinion Appln. No. PCT/US2020/060648 dated Feb. 12, 2021.

\* cited by examiner

*Primary Examiner* — Stefan Stoynov
(74) *Attorney, Agent, or Firm* — McAndrews. Held & Malfoy. Lid.

(57) ABSTRACT

Methods and systems for synchronization of multiple processing cores of an electronic control system are disclosed. The electronic control system is configured to monitor and control operation of a multicore architecture employing one or more processing cores to generate a time reference signal and/or to synchronize with the time reference signal. In some examples, the system employs a single master processor to generate the reference synchronization signal (e.g., a master sync signal). In examples, a rising edge of the partition time reference signal is used as the marker of reference time zero (e.g., the start of a new partition frame). If a core is out of sync with the master sync signal, that core adjusts one or more timing characteristics to align the associated signal with the reference signal.

19 Claims, 4 Drawing Sheets

SYSTEMS AND METHODS FOR SYNCHRONIZATION OF MULTIPLE PROCESSORS

FIELD

Certain embodiments of the disclosure relate to control systems. More specifically, certain embodiments of the disclosure relate to an electronic control system to monitor and control operation of a multicore architecture employing one or more processing cores to generate a time reference signal and/or to synchronize with the time reference signal. In some examples, the system employs a single master processor to generate the reference synchronization signal (e.g., a master sync signal). In examples, a rising edge of the partition time reference signal is used as the marker of reference time zero (e.g., the start of a new partition frame). If a core is out of sync with the master sync signal, that core adjusts one or more timing characteristics to align the associated signal with the reference signal.

BACKGROUND

Multicore processors include circuitry which includes two or more separate processing units, each configured to independently execute program instructions, increasing overall operating speed. In order to ensure multicore processors are able to effectively communicate and execute common tasks, each processor must operate in accordance with a common timing schedule. However, ensuring each multicore processor is properly synchronized can be challenging and complex, can cause gaps in control signaling, and lead to unnecessary faults. Thus, systems and methods to efficiently and accurately sync multicore processors are desirable.

Further limitations and disadvantages of conventional and traditional approaches will become apparent to one of skill in the art, through comparison of such systems with the present disclosure as set forth in the remainder of the present application with reference to the drawings.

BRIEF SUMMARY

Systems and/or methods are provided for synchronization of multiple processing cores of an electronic control system. In disclosed examples, the system monitors and controls operation of a multicore architecture employing one or more processing cores to generate a time reference signal and/or to synchronize with the time reference signal. In some examples, the system employs a single master processor to generate the reference synchronization signal (e.g., a master sync signal). In examples, a rising edge of the partition time reference signal is used as the marker of reference time zero (e.g., the start of a new partition frame). If a core is out of sync with the master sync signal, that core adjusts one or more timing characteristics to align the associated signal with the reference signal.

These and various other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

The figures are not necessarily to scale. Where appropriate, similar or identical reference numbers are used to refer to similar or identical components.

DETAILED DESCRIPTION

Some critical systems utilize two or more processing cores to ensure uninterrupted control of such systems. In some examples, the system comprises an electronic engine control system (e.g., an EEC), containing multiple processing cores (e.g., one or more master cores and/or one or more slave cores). Each core includes a timing mechanism (e.g., a tick, timing or clock signal generator). The disclosed design employs a mechanism to not only synchronize cores when a tick is being generated (e.g., by all active cores on the processors), but also to synchronize active software modules on the cores.

The systems and methods used for the synchronization between a reference synchronization signal (e.g. a first or master sync signal) and another sync signal (e.g. a second or slave sync signal) can be described as frame synchronization. In examples, frame synchronization refers to a process to monitor one or more slave sync signals, matching the timing of the one or more slave sync signals to a known timing device(s) of the master sync signal (e.g., a rising edge, a tick, a duty cycle, a period, a starting point, etc.) from a control processor or system (e.g., an active core). Framing can be described as the process of adjusting the timing of the received signal to align with a rising edge of the master sync signal pulse.

For purposes of synchronization, as used herein, the active core on a protection processor is identified as the "master core" and any processing core(s) not responsible for the generation of the partition frame signal are identified as "slave cores". For example, active cores on the protection processor that are not associated with the generation of the partition frame signal are considered slave cores to the master core (which generates the initial partition frame). When the slave cores are ready to run, the slave cores are configured to wait for detection of the rising edge of the new partition frame from the master processing core (e.g., based on instructions, such as software operating in a loop, triggered at the minor frame rate).

For the slave processing cores, the master processing core provides the start of the notification at the same time it triggers the rising edge associated with the partition frame. The techniques disclosed regarding synchronization are applicable to a multiple core application which may be governed by an operating system (OS) or may operate independently of an OS. In some examples, the mechanism used for one or both of an operating system and processor notification can be an operating system dependent mechanism which may vary based on specifics of the particular system, such as an operating system and/or in accordance with operator rules.

Synchronization between various cores and/or processors rests upon the establishment and maintenance of a consistent, system-wide common time base to which the various cores are synchronized.

A synchronization module or frame synchronizer matches the time of each frame in the slave sync signal to the timing device of the master sync signal to ensure slave sync signals (and associated processing cores) operate in accordance with a common time base as provided by the master sync signal and its associated processor (e.g., an active processing core). In some examples, framing is time-based, which monitors frames of a reference sync signal and another sync signal during a specific period of time. For example, a comparison between frames is used to adjust the slave sync signal to align frames for synchronization.

In some examples, the synchronization module is a circuit, a processor and/or a control system configured to carry out a frame synchronization process. For instance, the synchronization module can align pulsed frames of the two sync signals. Comparison of the two signals can be implemented via cross-correlation or other methods in the frame synchronization process. As a result, the timing or alignment of the slave signal can be adjusted to ensure each core operates in accordance with a common time schedule as established by a master reference signal.

In disclosed examples, an electronic control system design provides an active/standby architecture for multicore processor synchronization. In examples, each channel is associated with two processors, and each processor may have more than one enabled processing core.

In an example, the disclosed design employs multiple processors, and each processor may include multiple cores and each core may include an independent partition schedule. For instance, one or more of the various cores have different partition schedules, or one or more cores may have the same partition schedule. For example, the only time the active cores are likely to be synchronized is following a startup routine implemented in accordance with the system design and/or operator specifications. In some examples, the startup routine identifies a starting point corresponding to a partition schedule associated with one or more cores, as one or more of the associated partition schedules will start at the same time (e.g., at startup, corresponding to time zero).

A number of elements are employed to ensure system synchronization. For example, the disclosed system includes one or more mechanisms to generate a common reference time, with respect to one or both of a minor frame or a major frame, for instance. A mechanism can be used to sync multiple clocks associated with each respective multicore processor. Additionally, clock signals are monitored to recognize time drift, such that adjustments are made when needed to ensure the clock timing is bounded by desired parameters. Further, a mechanism can be employed to adjust for clock drift on a particular processing core (e.g., a slave processing core).

In some examples, processor and/or processing synchronization within a multicore processor may employ one or more modules, such as an operating system (OS) and/or a synchronization module. The operating system may control scheduling of tasks or processes or based on a common schedule or reference time. The operating system schedules processes at given times within a window of execution or frame.

The systems and methods for synchronization disclosed herein may employ hardware and/or firmware components to comprise a synchronization module. This synchronization module may partially or completely reside on a field programmable gate array (FPGA) and be accomplished by use of a hardware description language to create signals. In some examples, the synchronization module is implemented with one or more timers, which may be part of an associated processor, aided by software to control or manage such timers.

Timing within the electronic control system is based on one or more of major and minor frames, where a major frame includes a number of minor frames. The disclosed synchronization methods and systems provide a solution to a macro scheduling issue by implementing distributed alignment amongst the various cores. This is achieved by generating an initial signal, marking the start of a new frame, and making one or more associated timing devices available to other processing cores.

While one object of the disclosed systems and methods is to maintain synchronization of each processing cores at a minor frame level, another object of the systems and methods is to sync each processing core in accordance with a common major frame start point. For example, each application operating on the various processing cores will have be synced to the common major frame.

Each processor includes one or more modules to generate and/or monitor timing devices and/or signals. For instance, an oscillator can drive the processing core's clock signal. Each oscillator produces a periodic signal, which may be generated at a fixed rate. The periodic rate for each oscillator may fluctuate, due to the effects of age, temperature and manufacturing process, for instance, and become either faster or slower, in a phenomenon called clock drift. The systems and methods further provide a mechanism to monitor clock drift and to adjust an active processor to ensure each active core processor is synchronized to a common window frame period.

The disclosed system includes multiple components to execute the synchronization process, including a timer unit, a synchronization module, and a drift monitor. These components can be executed via circuitry, software, or a combination of hardware and software. The components operate independent of the other and may reside on one or more associated processors. One or more of the components could also be placed within an associated complex programmable logic device (CPLD) or FPGA.

In some disclosed examples, the system includes an EEC, which utilizes processors based on a symmetric multiprocessor (SMP) design, where each active processing core shares a centralized memory. For the master processor, the centralized memory includes internal SRAM and flash along with memory on an associated external bus. Each core may have dedicated register space and/or cache to allow each active core to execute the same code concurrently.

Synchronization of the electronic control system may require one or more of schedulers (e.g., one or more activity and/or operating system schedulers), partitions and processes, along with the tick generation signal, to be synchronized on each of the different processors and cores. For partition scheduling, time zero is the same for all processors and cores. Tick synchronization requires the ticks for all processors and cores to be generated at the same time. In order to ensure initial synchronization, the disclosed software design implements a signal-based Precision Time Protocol (PTP), such that a common synchronization signal (e.g., the first or master reference signal) is used instead of a communication packet or other embedded data.

Thus, the disclosed solution provides a multicore architecture employing one or more processing cores (e.g., a low-level co-processor, a peripheral, an I/O processor, an Enhanced Time Processor Unit (eTPU) microcode, etc.) to generate a partition time reference signal and/or to synchronize with the partition time reference signal. In some examples, the design employs a single master processor (e.g., a protection central processing unit (PCPU) on an active channel) to generate the reference synchronization signal (e.g., a master sync signal). The remaining active processors (e.g., slave processors) employ their respective processors to synchronize with the reference signal. In examples, a rising edge of the partition time reference signal is used as the marker of reference time zero (e.g., the start of a new partition frame). The clock synchronization design also incorporates the use of the partition time reference signal in the synchronization of the tick. If based on the comparison, a core is out of sync with the reference signal, that core adjusts one or more timing characteristics to align the associated signal with the reference signal.

In disclosed examples, a method for synchronizing multiple processors includes generating, from a first processor, a first sync signal from a first clock corresponding to a first partition frame, generating, from a second processor, a second sync signal from a second clock, receiving, at the second processor, the first sync signal, comparing, at the second processor, a rising edge of the first sync signal to a rising edge of the second sync signal, determining, at the second processor, a difference between the rising edges of the first and second sync signals, and adjusting a period of the second sync signal based on the difference.

In some examples, the method includes monitoring the second signal, comparing the second sync signal with the first sync signal at a time before or after each rising edge or tick associated with the first sync signal to determine the difference, determining whether the difference between the first and second sync signals is before or after the rising edge of the first sync signal, and adjusting the period of the second sync signal to align with the first sync signal in response to the difference.

In some examples, the method includes measuring a period of the first and second sync signals, wherein the comparison is a comparison of the relative period. In examples, the method includes measuring a duty cycle of the first and second sync signals, wherein the comparison is a comparison of the relative duty cycles.

In examples, the method includes comparing the difference to a list of threshold values, and adjusting the period of the second sync signal by extending the period of the second sync signal by a first amount when the difference is outside a first threshold and within a second threshold. In some examples, the method includes adjusting the period of the second sync signal further includes extending the period of the second sync signal by a second amount when the difference is outside a second threshold.

In examples, the method includes adjusting the period of the second sync signal over one or more duty cycles of the second sync signal until the difference is within the first threshold or the duty cycles of the first and second sync signals are the same. In examples, a duty cycle of the second sync signal corresponds to a given minor frame of a plurality of minor frames within the first partition frame.

In some examples, the method includes generating the first or second sync signal via respective a phase lock loop module. In examples, the method includes measuring the first or second sync signal via a synchronization module. In examples, the first processor corresponds to a master processor, the first sync signal designated as a reference sync signal to the second processor. In some examples, the reference sync signal includes one or more first ticks marking a period of the first sync signal. In some examples, the second sync signal includes a second tick marking a second period of the second sync signal.

In some examples, the method includes monitoring, at the second processor, the signal for a predetermined time period of time, receiving, at the second processor, a signal that the first sync signal is unavailable or receiving no signal within the predetermined period of time, and executing, at the second processor, a free running mode in response to an unavailable signal or no signal within the predetermine period of time. In some examples, the predetermined time period is adjustable.

In disclosed examples, a system for synchronizing multiple processors includes a first processor includes a first clock, the first clock configured to generate a first sync signal corresponding to a first partition frame, and a second processor includes a second clock configured to generate a second sync signal, and a synchronization module configured to receive the first and second sync signals, compare a rising edge of the first sync signal to a rising edge of the second sync signal, and determine a difference between the rising edges of the first and second sync signals, wherein the second clock is configured to adjust a period of the second sync signal based on the difference.

In some examples, the synchronization module is further configured to compare the difference to a list of threshold values, and adjust the period of the second sync signal by extending the period of the second sync signal by a first amount when the difference is outside a first threshold and within a second threshold.

In examples, the synchronization module is further configured to adjust the period of the second sync signal further includes extending the period of the second sync signal by a second amount when the difference is outside a second threshold.

In some examples, the synchronization module is further configured to adjust the period of the second sync signal over one or more duty cycles of the second sync signal until the difference is within the first threshold or the duty cycles of the first and second sync signals are the same.

As utilized herein, "and/or" means any one or more of the items in the list joined by "and/or". For example, "x and/or y" means any element of the three-element set {(x), (y), (x, y)}. Similarly, "x, y, and/or z" means any element of the seven-element set {(x), (y), (z), (x, y), (x, z), (y, z), (x, y, z)}. As utilized herein, the term "module" refers to functions that can be implemented in hardware, software, firmware, or any combination of one or more thereof. As utilized herein, the term "exemplary" means serving as a non-limiting example, instance, or illustration.

As utilized herein, the terms "first" and "second" may be used to enumerate different components or elements of the same type, and do not necessarily imply any particular order. For example, while in some examples a first time occurs prior to a second time within a time period, the terms "first time" and "second time" do not imply any specific order in which the first or second times occur relative to the other within the time period.

As utilized herein, a "circuit," or "circuitry," includes any analog and/or digital components, power and/or control elements, such as a microprocessor, digital signal processor (DSP), software, and the like, discrete and/or integrated components, or portions and/or combinations thereof.

As utilized herein, the terms "control circuit," "control circuitry," and/or "controller," may include digital and/or analog circuitry, discrete and/or integrated circuitry, processors, microprocessors, digital signal processors (DSPs), and/ or other logic circuitry, and/or associated software, hardware, and/or firmware. Control circuits or control circuitry may be located on one or more circuit boards that form part or all of a controller.

As utilized herein, the term "operating system" or OS includes the software that supports a computer or processor's basic functions, such as scheduling tasks, executing applications, and controlling associated devices.

As utilized herein, the term "memory" includes volatile and non-volatile memory devices and/or other storage device.

Figure 1:
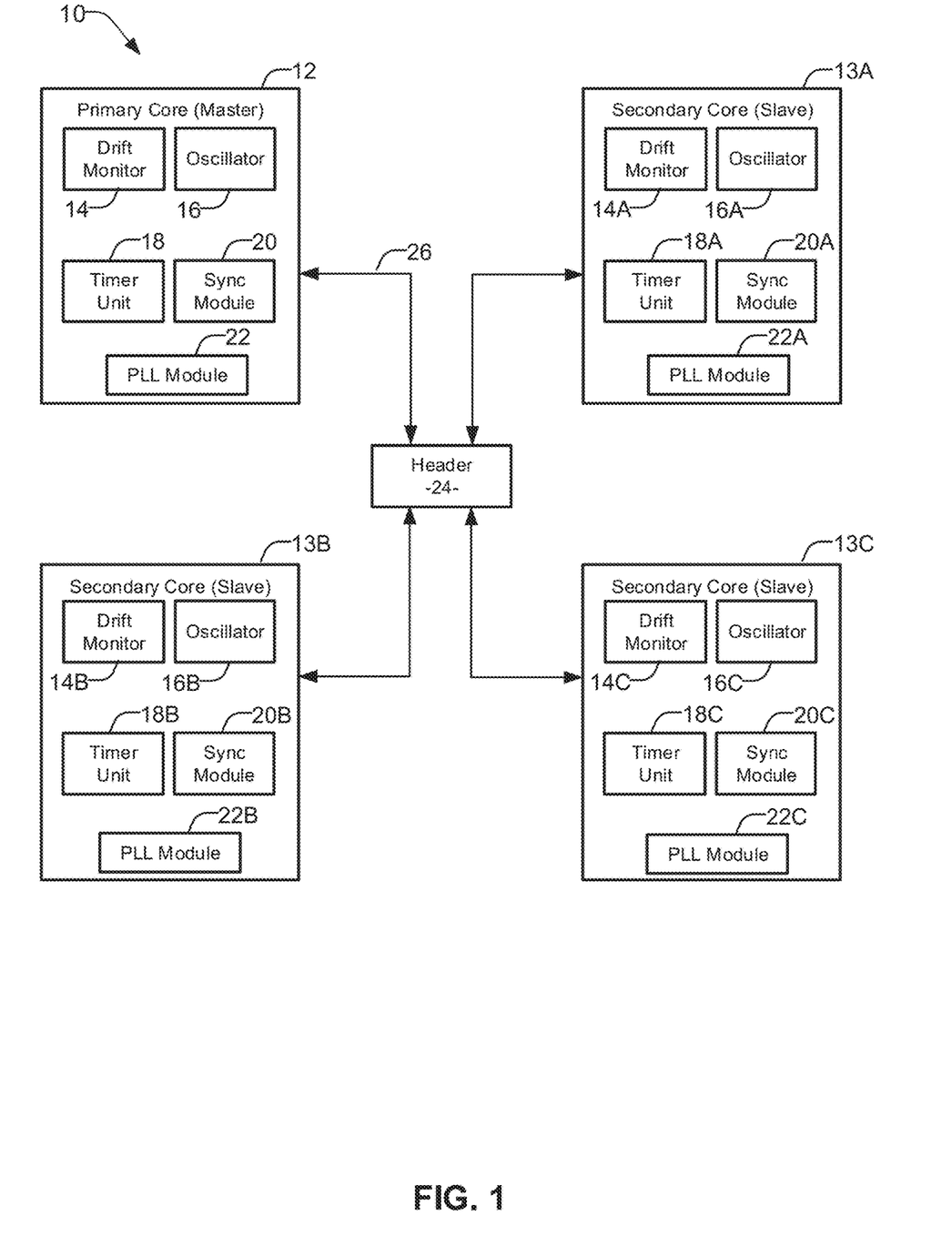
FIG. 1 illustrates an example schematic of a control system having multiple processing cores, in accordance with an example embodiment of the disclosure.

In the example of FIG. 1, a system 10 (e.g., an electronic engine control) includes four processing cores 12 and 13A, 13B and 13C. Each processing core contains a timer unit 18, which may be managed by firmware within a sync module 20. A drift monitor 14 utilizes the processor's independent phase lock loop (PLL) module 22 to monitor timing of the clocking within the processor. The processing cores may be connected via one or more channels 26, with signals between processing cores routed through one or more headers 24.

During operation, all scheduling events within the timer unit are based on information from a common clock source. For example, if an operating system employs more than one timer unit for scheduling events, each timer unit is based on the same clock reference. In some examples, two or more clock units are used for scheduling purposes.

Each oscillator 16 is used as a reference clock by the processing cores' phase lock loop (PLL) module 22. The PLL module 22 may generate frequencies greater than the reference clock. Thus the PLL output signal is used as a clock reference/source by one or more internal devices associated with the processor, such as communication engines, timing for the external bus, and timing by the active cores.

Each active core uses the PLL output signal to drive one or more internal clock counters. One or more of the internal clocks counters is used to represent logical time (e.g., as each clock counter is independent of the other processor's clock counters). Since the four processors within the electronic control system are independent, core-clocks can start at different times and operate at different rates.

Within the electronic control system, a timing correlation should exist as to when external events (e.g., inputs and/or outputs occurring in physical time or absolute time) occur and when the various cores are to process and/or respond to these events. The synchronization module is to map logical time of a given core to a common absolute time.

Additionally or alternatively, one or more processing cores may include a clock drift monitor 14. The clock drift monitor 14 monitors one or more test signals (e.g., derived from the respective core's PLL and/or a separate and/or external oscillator) and compares the test signals to one or more references to ensure a respective clock is within an allowed tolerance (e.g., +/−2% variance). Each clock drift monitor 14 will utilize its own, high accuracy oscillator for making timing measurements. This test signal is continually monitored to verify that the clock drift is within a given period of time (e.g., within a fixed variance, bounded, etc.). If the drift monitor 14 determines the clocking is outside the given period of time, the drift monitor 14 returns a fault signal back to the respective processor.

As shown in FIG. 1, each processing core 12, 13A-C is associated with a single respective oscillator 16, 16A-C. In some examples, one or more of the processing cores 12, 13A-C may include multiple oscillators, or may share a common oscillator. Each of the processing cores 12, 13A-C generates a sync signal, which includes timing information based on the core clock timing from a respective oscillator 16, 16A-C. An active processing core operating as a master or primary core outputs a master sync signal to the other processors, whereas slave or secondary cores have slave sync signals routed back as feedback. For example, each master sync signal constitutes one or more timing references, to which the slave processing cores 13A-C will synchronize. There may be multiple slave processing cores, but only a single processing core will operate as a master core at a time, providing a single master or primary sync signal.

Based on a comparison of the master signal and the slave signal, each slave processing core 16, 16A-C is configured to adjust a pulse of the output sync signal to align with a pulse period of the master sync signal. In other words, each slave processing core 16, 16A-C uses the master sync signal as a reference signal when a new frame starts, and the slave processing core then matches the minor frame duty cycle of the slave sync signal to that of the master sync signal. If the slave processing core is out of sync with the master processing core, the slave processing core adjusts one or more signal characteristics to align with the master sync signal. This can be implemented by extending the period of the signal (e.g., by a predetermined amount and/or a maximum defined amount) until a comparison of the signals indicates the master and slave sync signals are aligned within a desired threshold amount. Having sufficiently aligned, the slave processing core may adjust the period to match the period of the master sync signal.

Although shown as separate modules in FIG. 1, the sync module 20 may include timer unit 18 and firmware. The firmware may be system specific and may be based on where the timer unit 18 resides (e.g., on a FPGA, part of a processor, etc.). In systems that support multiple cores, the firmware may be designed to interact with two or more cores (e.g., a shared sync module) or each core may have a dedicated sync module. In systems with a single active core, the firmware controlling the timer unit 18 may be used to update the master core timer unit and/or system tick (e.g., clock or oscillator 16), such that each core employs a common tick duration for a respective minor frame time.

As disclosed herein, each slave processing core 13A-C receives the master sync signal and its own sync signal. Firmware associated with a given slave core can serve as a mechanism to adjust the generated sync signal, such as in response to a start of a new minor frame.

A master sync signal may contain information corresponding to timing. For example, the rising edge of the master sync signal represents a start of a new minor frame. The signal duty cycle corresponds to a particular minor frame within an associated major frame. This means that the master core timing unit is to generate a pulse width modulation (PWM) signal where the duty cycle may vary between adjacent or sequential minor frames, and the timing unit 18 is to measure one or both of the edge time or the duty cycle to perform the synchronization process.

In example embodiments, the master sync signal may employ different duty cycles. For example, different duty cycles may identify a signal as originating from a master sync signal, and/or indicate in which frame the master signal is currently transmitting. For example, during initialization, the master processing core transmits a signal with a 50% duty cycle. This informs the receiving slave processing cores that the transmitting core became active first (and therefore designated as the master processing core). Thereafter, the master processing core does not change its tick period, but the duty cycle may change to convey frame information. As the master processing core does not intentionally change its period, any change detected by a slave processing core is likely due to oscillator or clock drift and not initiated by the firmware.

In some examples, duty cycles from 10%, 20%, 30% and 40% are used to indicate that this signal is the master sync signal and in frame number one, frame number two, frame number three, frame number four, respectively. When a processing core is operating as a slave processing core, it transmits sync signals with different duty cycles, such as 60%, 70%, 80%, and 90%.

When a processing core transmitting as a master processing core does not receive another master sync signal (e.g., during an initialization or startup event) within a minor frame, that processing core is confirmed as the master processing core and continues to transmit a master sync signal with the duty cycles of 10%, 20%, 30% and 40%. A processing core that operates only as a slave processing core waits for receipt of a master sync signal during a predetermined amount of time (e.g., a default and/or user configurable "timeout" time).

In some examples, the system attempts channel and processing core synchronization prior to giving control to the application software (AS). Efforts to synchronize are conducted for a predetermined timeout period. The timeout period can be specified by relative software modules, provided by an operator, and/or determined by an operating system. If no such signal is received within the predetermined timeframe, the slave processing core implements a "free running" mode.

In the case where the sync slave is operating in this free running mode, the slave processing core is continuously or periodically monitoring signals for receipt of a sync pulse signal from a master processing core. Once a master sync signal (e.g., a pulsed signal) is detected, the slave processing core will sync to the master core's sync signal (e.g., the signal's duty cycle and/or frame). In some examples, a slave processing core employing this process could sync to signal generated from a master processing core that is in slave mode (e.g., in the absence of a sync signal from a designated master processing core).

In some situations, a slave processing core may adjust operation to avoid conflicting sync signals or in the absence of a sync signal. For example, at a given time a system may have more than one master processing core. To avoid slave processing cores attempting to align with multiple or conflicting signals, a single processing core of the multicore processor may be designated as the only processing core authorized to operate as a master processing core. In some examples, during an initial startup routine, the first core to generate a sync signal is designated as the master processing core.

In additional or alternative examples, a tie-breaking mechanism may be implemented in cases when timing is such that multiple processors become operational at the same time or within a threshold time. In such situations, a predetermined processing core may take priority, and/or one or more characteristics of the two or more cores may be analyzed to determine which core will become the master processing core.

For example, the slave processing core may detect two master sync signals (e.g., from two master cores) and will sync to a default sync master processing core (e.g., identified as a superior core, or having some other characteristic providing a superior claim as master processing core). The synchronization module of each processing core provides sync status information indicating whether the processing core is in sync with the master processing core and if the processing core is a master or a slave. Another instance is when the slave processing core has synced to a master processing core which is then transitioning to a slave processing core (e.g., in response to a fault or commanded transition). The slave processing core that was syncing to the transitioned core continues to monitor incoming sync signals until another master sync signal is detected.

In some examples, firmware provides a mechanism to change a processing core from a master processing core to a slave processing core, or vice versa. A slave processing core may switch syncing to a different master processing core if the previous master processing core becomes a slave processing core and the slave processing core starts monitoring signals for a new master signal. In response, the slave processing core will switch and sync with the current master sync signal.

In some examples, when multiple processing cores are available but not synchronized, one or more processing cores may maintain synchronization with one or more local processing cores.

When a given processing core starts up and the electronic control system 10 is set to initialize, the system does not begin the partition scheduling unless the given core is associated with the active protection central processing unit (e.g., the PCPU). If the given core is associated with the active processing core (e.g., an active core), a trigger is provided (e.g., from a set of instructions, such as via an operating system) to the given processor indicating that a new partition frame is starting (as represented by arrow 34 at an initial transmission of signal 30). At this time, the processor generates the rising edge of the new frame, which, in some examples, is used as a reference marker for a comparison signal (e.g., generated from a core (master) separate from the core (slave) that generated the signal for comparison).

In some examples, the rising edge may correspond to a signal tick and/or a signal with a sinusoidal character, such that the rising edge is defined as an upward slope from a threshold value or location on a corresponding waveform. In additional or alternative examples, the rising edge is defined as a change from a null or relatively constant value. The manner and type of trigger from the processor may vary based on specifics of the particular control, application, operating system and/or in accordance with operator rules. In some examples, a particular processor has multiple cores such that the processor identifies which core is associated with the partition frame, sync signal, and/or associated rising edge used during the comparison.

Once identified, the rising edge of a pulse train from the active core indicates the start of a new partition frame to sync with the remaining cores. The period of this partition frame signal may be based on a predetermined number of ticks. In other words, the initial tick and the start of a new partition frame can be aligned/synchronized with one another. Thus, the active protection processor generates the pulse train such that the rising edge occurs after the predetermined number of ticks. The receiving core synchronizes both the associated partition framing and tick schedule from this reference signal.

Figure 2:
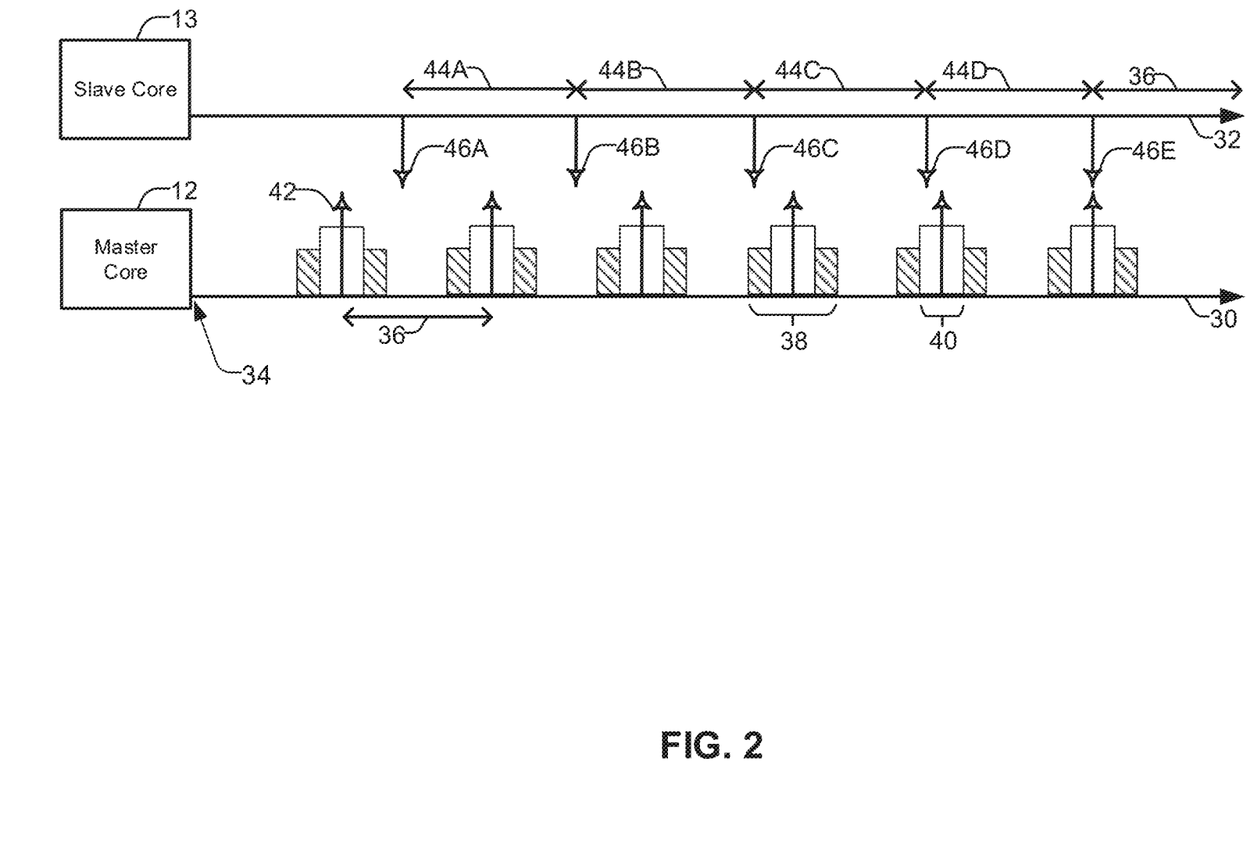
FIG. 2 illustrates an example process diagram for processing core synchronization, in accordance with an example embodiment of the disclosure.

As shown in FIG. 2, a master processing core 12 generates a pulsed master sync signal 30. The master sync signal 30 is pulsed in accordance with a predetermined timing scheduled, shown as a tick or rising edge 42 and period 36. Thus, at the beginning of a new frame 34, the master sync signal 30 is generated and transmitted to each other associated processing core. A slave processing core 13 will also generate a slave sync signal 32, which may be pulsed with a period 44. However, in the example of FIG. 2, the slave sync signal 32 is out of sync with the master sync signal 30, as tick 46A is not aligned with tick 42.

Based on a comparison of the pulsed signals (e.g., via a sync module 22), the slave core 13 will adjust a period of the pulsed signal 32 until the slave sync signal 32 is aligned with master sync signal 30. For example, the master sync signal 30 may generate a pulsed signal with a predetermined period 36. The slave sync signal 32, however, may be different from the period 36. As shown, an initial tick 46A from slave sync signal 32 (with a period 44A) is misaligned from tick 42 of the master sync signal 30 (as determined via sync module 22). In order to realign the signals, the slave processing core 13 adjusts one or more of the subsequent periods 44B, 44C, and 44D, until tick 46E is once again aligned with tick 42. In examples, the adjustment to each of the periods 44B, 44C, and 44D can be the same or different (e.g., in response to a subsequent comparison during monitoring). In some examples, the slave processing core 13 identifies the difference in timing, and adjusts the period by an amount equivalent to the difference to realign tick 46 with tick 42.

The sync module 20 is configured to perform both major frame and minor frame synchronization. When the slave core 13 is out of sync with the master core 12, frame synchronization is achieved by adjusting (e.g., extending or contracting) a period of a slave minor frame period until the slave major frame is in sync with the master major frame. In some examples, the performance analysis of logs (PAL) software from the slave core 13 synchronizes the slave signal 32 tick 44 to the tick 42 by extending the period 44. In some examples, each slave core synchronizes to the master signal tick 42 by extending the period of the system signal alone, and by no other corrective action. Concurrently or subsequently, the duty cycle is updated during the synchronization process. Having sufficiently aligned (e.g., within one or more predetermined timing thresholds), the slave processing core 13 may adjust the period again to match the period 36 of the master sync signal 30.

Extending the period of the signal 32 may be by a predetermined amount, a maximum defined amount, and/or may be dynamically adjusted based on a comparison between subsequent ticks of the slave signal and the master signal. The period 44 may continue to be adjusted until a comparison of the signals indicates the master sync signal 30 and the slave sync signal 32 are aligned within a desired threshold amount.

In some examples, the slave processing core 13 compares tick 46 to tick 42 based on one or more thresholds (e.g., a synchronization envelope or sync tolerance). As shown in the example of FIG. 2, the sync firmware executes at the beginning of each new minor frame 34. For a slave core 13, the sync module 22 monitors whether the core 13 is in sync with the master sync signal 30 major frame and/or within a predetermined synchronization envelope 38. For instance, the synchronization envelope is a configurable parameter that defines the region within which the slave core signal timing is considered in sync with the master system tick 42.

The synchronization envelope 38 is the allowed variance between the slave processing core's 13 new window of time and the start of a new minor frame from the master core 12. If the slave sync module 22 detects that the new window of time from the slave sync signal 32 is outside of the synchronization envelope 38, the sync module 22 increases the minor frame period 44 (e.g., within a range of values up to a maximum amount) until the slave sync signal is in one or both of frame sync and sync tolerance.

The synchronization envelope 38 may have one or more associated thresholds. In the example of FIG. 2, ticks 46A and 46B are both outside the synchronization envelope 38. The adjustment to the period 44, however, has brought tick 46C within an outer threshold of the synchronization envelope 38. Tick 46D continues to near the tick 42, and reached an inner threshold 40. Ultimately, tick 46E is in alignment with tick 42 (and therefore the duty cycle of the master sync signal 30), and the period of slave sync signal 32 is adjusted accordingly.

In some examples, the sync module 22 will recognize that tick 46 is within the synchronization envelope 38 (and/or within inner threshold 40), and determine no corrective action is required. Thus, slave signal tick 46 may be within the synchronization envelope 38 but not within frame sync, but period adjustment may not be implemented.

As disclosed herein, the tick and the start of the new partition frame are initially aligned/synchronized, which provides a reference signal for comparison with the various comparison tick signals (e.g., from one or more slave processing cores). A core's tick clock runs 10 to 1000 times faster than the tick itself and/or the clock associated with the processor. Thus, the tick generated by a core is a tick granularity referred to as a micro tick. Due to this micro tick granularity, adjustments to the tick generation occurs. For example, the software can either increase or decrease the number of micro ticks required to generate the core's tick in order to adjust when a tick occurs.

Synchronization of different cores on the one or more processors can be achieved by comparing the difference between when the particular processor predicts a new partition frame to start versus when the rising edge of the partition frame signal from the master core indicates it is to occur. For instance, the system assumes the propagation delay is negligible between all the processors. This difference in time between the previously predicted start of a new partition frame and the newly calculated time is distributed evenly over the number of ticks until a new partition frame is commanded by the OS.

Figure 3:
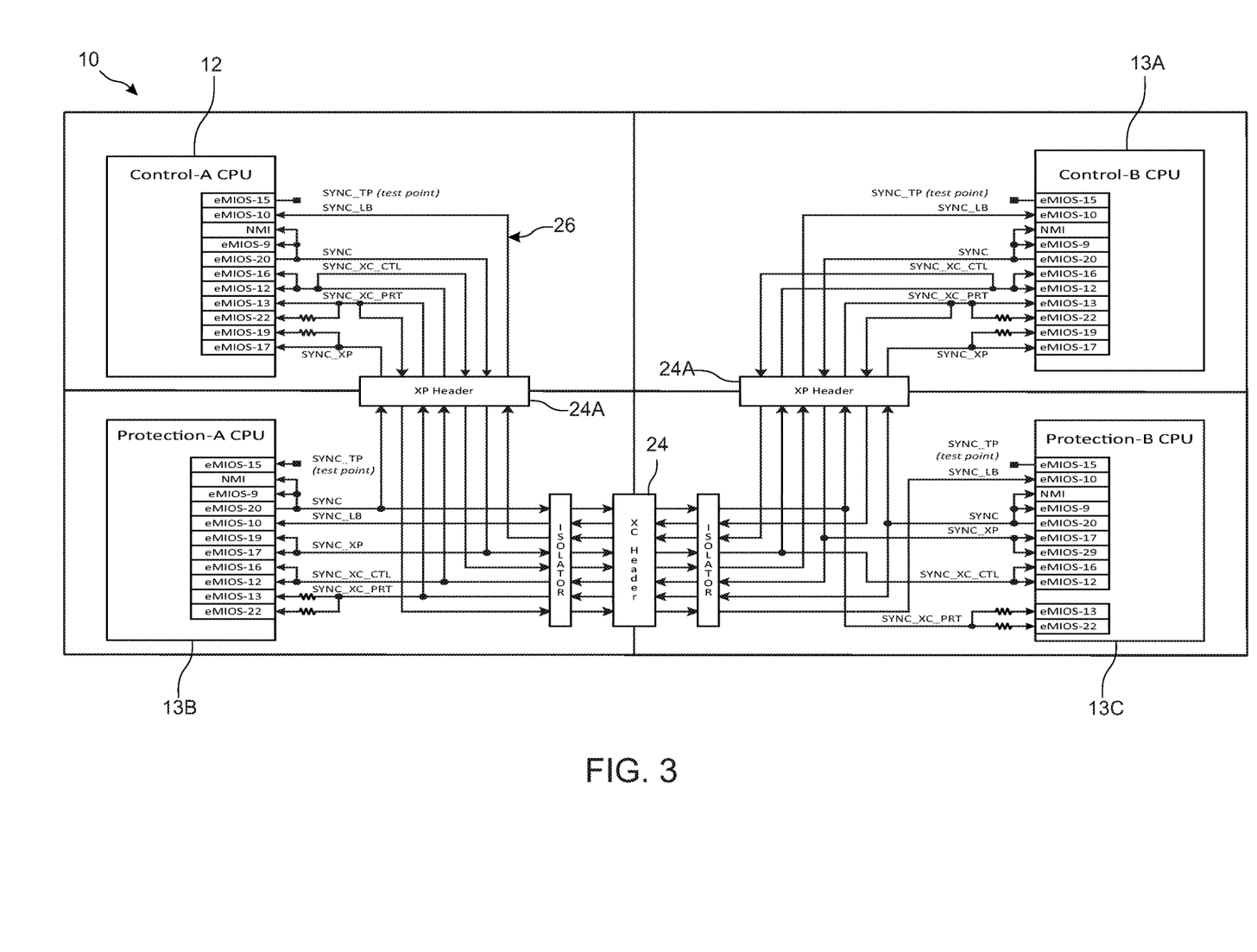
FIG. 3 illustrates another example schematic of an electronic control having multiple processing cores, in accordance with an example embodiment of the disclosure.

Turning now to FIG. 3, illustrated is an example schematic of an electronic control system 10 having multiple processing cores 12, 13A-C. As shown in FIG. 3, the synchronization circuitry consists of four discrete signal channels (e.g., one signal per processing core). Each processing core receives either three signals (e.g., for a master processing core) or five signals (e.g., for a slave processing core). The sync signal includes the system tick generated by the oscillator 16 that defines the minor frame time.

Synchronization of each slave processing core is based on a common clock source within that processing core, provided by an enhanced modular input/output subsystem (eMIOS) channel. In some examples, one or more eMIOS channels generate the system tick signal. Each slave processing core has its system tick routed to a channel (e.g., an eMIOS channel) for comparison with the master core system tick. In the example of FIG. 3, each processor uses eMIOS channel-20 to generate the system tick. One or more of the system tick signals are generated with a different duty cycle. Each processor's system tick is then routed to eMIOS channel-9 for comparison to the master sync signal pulse.

Each processor uses eMIOS channels-12 and -16 for processing cross-channel master sync signal pulses. The slave cores employ two extra channels (e.g., eMIOS channels-17 and -19) for processing that channel's master sync signal pulse. In some examples, a common firmware can be used for each processor due to the symmetry of the eMIOS channels employed. Furthermore, by executing the process as disclosed herein, the firmware is able to sync each processor to within approximately 1 microsecond of the other.

During a synchronization routine, each slave processing core includes performance analysis of logs (PAL) software (e.g., operating on the respective processing core). In some examples, the PAL software is responsible for performing the synchronization with respect to the system tick in comparison to the master processing core. The master sync signal provides a reference pulse to which other processors (e.g., slave processing cores) compare and adjust their clock to, in response to signal analysis from the PAL software.

The PAL software from each slave processing core synchronizes its system tick to the master processing core's system tick by extending the period of the slave processing core's timing signal. In some examples, each slave processing core synchronizes to the master processing core's tick by extending the period of the system signal alone, and by no other corrective action. Once determined, each respective PAL software can provide status information indicating with which of the other processing cores it is in sync (e.g., the master processing core and/or one or more slave processing cores).

In some examples, the system tick signal is routed via an available channel or pin (e.g., a general-purpose input/output (GPIO) pin, associated with Critical Interrupt IVOR0) and back to an eMIOS channel. Via the eMIOS channel, the system tick signal is compared and analyzed to determine whether the processing core is in sync with one or more of the master processing core (e.g., if the processing core is a slave), or one or more slave processing cores (e.g., if the processing core is the master processing core). Additional or alternative processing cores may be included in the system 10, each of which may generate a tick signal that is compared with a tick signal of each respective processing core.

A feedback signal is routed back from the processing core channel-9 to the processing core that generated the particular system tick signal. The return signal is used to detect an error with the sync signal (e.g., based on a comparison of the sync signal with the master signal). For example, the feedback signal can be used to determine a propagation delay in the particular system tick signal.

In some examples, the master sync signal may not detect a feedback signal following transmission of the generated sync master tick signal. For example, the feedback signal may not be detected within a predetermined period of time to register a response, the feedback signal may exhibit some type of defect, or other information or circumstance may indicate the sync master tick signal that a fault has occurred. In response, the master sync processing core will forward a fault status to one or more associated processors.

In some examples, each slave processing core generates a sync signal periodically and/or on command. The signal is compared to the original sync master signal until the slave processing core detects that the master processing core is no longer present (e.g., is offline and/or has discontinued generation of a master sync signal), and/or had its designation changed from master to slave In some examples, upon loss of detection from a sync master signal, both the master processing core and the slave processing cores are configured to transition to a free-running mode (e.g., no adjustments are made to the internal clock or pulse generator until a reference sync signal is detected). For example, even after losing a master sync signal, each slave processing core continues to generate a sync signal and/or monitor for a reference sync signal (e.g., from a master processing core). Once a reference signal has been detected, the slave sync signal is compared and adjustments to the period are made based on the comparison, as described with reference to FIG. 2. The amount of adjustment available to each signal to come into sync with the reference signal is itself adjustable.

In some examples, the PAL software may receive information regarding a tolerance for each slave processing core with respect to the master sync signal. For instance, a user can set a range of values and/or a percentage of a desired value (e.g., a maximum value range of approximately +/−4.5 ms) beyond which the slave processing core would be considered out of sync.

In view of the set range of values, the application software provides range information to the PAL software. In response, the PAL software (via one or more modules) compares and analyzes the master sync signal and a slave sync signal. For example, the PAL software solution may calculate an offset value in accordance with the predetermined range of values.

In some examples, an enable flag indicates that one or more slave CPUs are to be held out of sync by the offset value. When the enable flag is reset, the one or more slave processing cores are to again sync with the master processing core.

In some examples, a PAL data file exists to contain the range of values for signal evaluation. For instance, a synchronization envelope or tolerance defines the maximum allowed clock variance between the master processing core system tick signal and the slave processing core, which may also be considered in sync in microseconds. A maximum increment can be defined as the maximum amount of time by which the system tick (period) can be extended (e.g., referenced in microseconds). A timeout period defines the maximum amount of time that the slave processing core can be held for execution (e.g., readjustment) while the PAL software synchronizes the slave processing core tick with the master processing core tick signal.

In some examples, channels are also synchronized. For instance, channel synchronization can determine which channel serves as a reference channel (e.g., associated with a master processing core and/or master sync tick signal) and which channel or channels are compared to the reference channel (e.g., associated with a slave processing core and/or slave sync tick signal).

As disclosed herein, the system 10 can select a synchronization master processing core to provide the sync signal for reference in accordance with one or more selection schemes. For example, a master processing core may be selected from a plurality of processing cores at random, in accordance with one or more parameters and/or calculations, and/or in response to an input from an operator.

In some examples, following power-on reset and/or initialization of the system 10, and in the absence of processor faults preventing synchronization, and having power available at all channels and processing cores (e.g., control and protection processors), each processing core 12, 13A-C associated with the system 10 is synchronized within a task synchronization time period (e.g., 5 milliseconds) and with the tolerance (e.g., range) specified (e.g., by an operator selection, application specific schema, and/or an operating system instruction).

Continuously, periodically, and/or in response to a command, the system 10 shall provide synchronization status indications to each processing core. The synchronization status may be individual (e.g., whether the respective processing core is synced with the master processing core); may identify the synchronization status of each processing core (e.g., with respect to the master processing core); and/or may identify a particular synchronization status (e.g., a fault, a master processing core operating as a slave, a slave processing core operating as a master, etc.).

Figure 4:
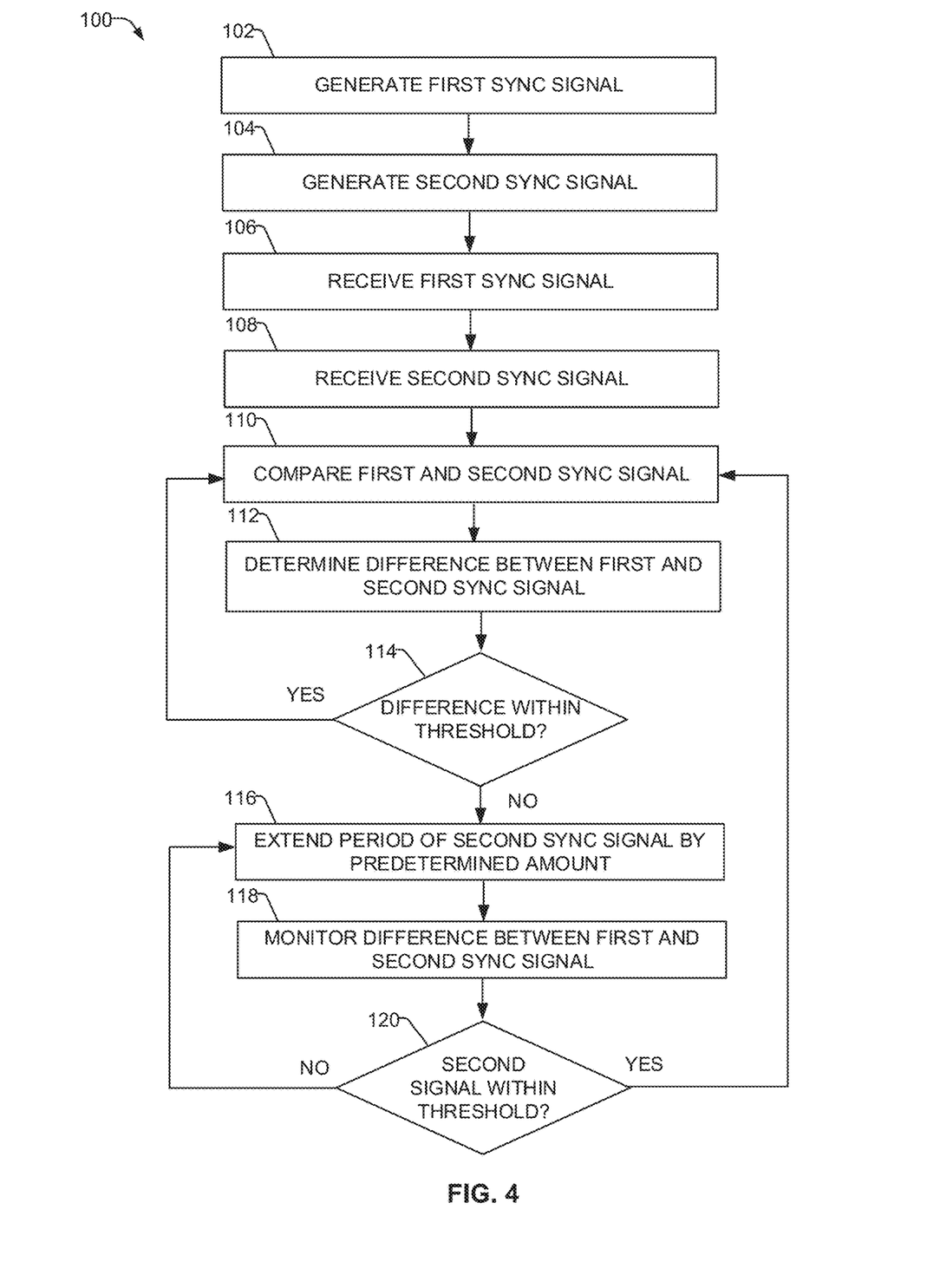
FIG. 4 illustrates an example method of processing core synchronization, in accordance with an example embodiment of the disclosure.

FIG. 4 illustrates a method 100 to implement an example synchronization process, in accordance with disclosed embodiments. In block 102, a first sync signal is generated at a first processor (e.g., a master processing core 12) from a first clock (e.g., an oscillator 16) corresponding to a first partition frame. In block 104, a second sync signal is generated at a second processor (e.g., a slave processing core 13) from a second clock (e.g., an oscillator 16). In block 106, the first sync signal is received at the second processor. In block 108, the second sync signal is received at the second processor as a feedback signal.

In block 110, timing of the first sync signal is compared to a timing device of the second sync signal at the second processor. For example, a timing device (e.g., a rising edge or tick) of each signal is compared. Based on the comparison, a difference between the timing of the two signals is determined in block 112. In block 114, the difference is compared to one or more threshold values (e.g., corresponding to a synchronization envelope 38 or inner threshold 40). If the timing difference is within a desired threshold (predetermined, programmed, and/or calculated), the method returns to block 110 to continue to compare the signals to ensure the first and second signals remain in sync.

If the timing difference is not within a desired threshold, the second sync is adjusted in block 116, such as by extending a period of the second sync signal. In block 118, the difference between the first and second sync signals is monitored (e.g., by synchronization module 40). The signal difference is again compared in block 120, where if the difference between signals is not within a desired threshold, the method returns to block 116 to continue to adjust the period of the second signal. If the difference is determined to be within a desired threshold, the method returns to block 110 to continue to compare the signals to ensure the first and second signals remain in sync.

With reference to the several figures, multiple advantages are achieved through the innovative systems and methods disclosed herein. For example, the disclosed system is configurable to control multiple systems from a common base. The system is designed to readily extend to multiple devices, such as having multiple associated cores, with each of the cores synchronized to a common synchronization source. The system can provide data to an application as to that application's synchronization status, including whether or which minor frame within a major frame is being compared to the synchronization signal. Engine transients are reduced during channel switchover (e.g., the period when no channel is in control is reduced compared to conventional approaches). The system ensures reception and/or transmission of data between different channels and/or processors occurs during a desired window of time. Furthermore, data transfer latencies between multiple processors are minimized, which improves performance over conventional techniques.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for synchronizing multiple processors comprising:
   generating, from a first processor, a first sync signal from a first clock corresponding to a first partition frame;
   generating, from a second processor, a second sync signal from a second clock;
   receiving, at the second processor, the first sync signal;
   comparing, at the second processor, a rising edge of the first sync signal to a rising edge of the second sync signal;
   determining, at the second processor, a difference between the rising edges of the first and second sync signals; and
   adjusting a period of the second sync signal based on the difference.

2. The method of claim 1, wherein comparing further comprises:
   monitoring the second sync signal;
   comparing the second sync signal with the first sync signal at a time before or after each rising edge or tick associated with the first sync signal to determine the difference;
   determining whether the difference between the first and second sync signals is before or after the rising edge of the first sync signal; and
   adjusting the period of the second sync signal to align with the first sync signal in response to the difference.

3. The method of claim 1, further comprising measuring a period of the first and second sync signals, wherein the comparison is a comparison of the relative period.

4. The method of claim 1, further comprising measuring a duty cycle of the first and second sync signals, wherein the comparison is a comparison of the relative duty cycles.

5. The method of claim 1, further comprising:
   comparing the difference to a list of threshold values; and
   adjusting the period of the second sync signal by extending the period of the second sync signal by a first amount when the difference is outside a first threshold and within a second threshold.

6. The method of claim 5, wherein adjusting the period of the second sync signal further comprises extending the period of the second sync signal by a second amount when the difference is outside a second threshold.

7. The method of claim 5, further comprising adjusting the period of the second sync signal over one or more duty cycles of the second sync signal until the difference is within the first threshold or the duty cycles of the first and second sync signals are the same.

8. The method of claim 1, wherein a duty cycle of the second sync signal corresponds to a given minor frame of a plurality of minor frames within the first partition frame.

9. The method of claim 1, further comprising generating the first or second sync signal via respective a phase lock loop module.

10. The method of claim 1, further comprising measuring the first or second sync signal via a synchronization module.

11. The method of claim 1, wherein the first processor corresponds to a master processor, the first sync signal designated as a reference sync signal to the second processor.

12. The method of claim 11, wherein the reference sync signal comprises one or more first ticks marking a period of the first sync signal.

13. The method of claim 11, wherein the second sync signal comprises a second tick marking a second period of the second sync signal.

14. The method of claim 1, further comprising:
monitoring, at the second processor, the first sync signal for a predetermined time period of time;
receiving, at the second processor, a signal that the first sync signal is unavailable or receiving no signal within the predetermined period of time; and
executing, at the second processor, a free running mode in response to an unavailable signal or no signal within the predetermined period of time.

15. The method of claim 14, wherein the predetermined time period is adjustable.

16. A system for synchronizing multiple processors comprising:
a first processor comprising a first clock, the first clock configured to generate a first sync signal corresponding to a first partition frame; and
a second processor comprising:
a second clock configured to generate a second sync signal; and
a synchronization module configured to:
receive the first and second sync signals;
compare a rising edge of the first sync signal to a rising edge of the second sync signal; and
determine a difference between the rising edges of the first and second sync signals, wherein the second clock is configured to adjust a period of the second sync signal based on the difference.

17. The system of claim 16, wherein the synchronization module is further configured to:
compare the difference to a list of threshold values; and
adjust the period of the second sync signal by extending the period of the second sync signal by a first amount when the difference is outside a first threshold and within a second threshold.

18. The system of claim 17, wherein the synchronization module is further configured to adjust the period of the second sync signal further comprises extending the period of the second sync signal by a second amount when the difference is outside a second threshold.

19. The system of claim 17, wherein the synchronization module is further configured to adjust the period of the second sync signal over one or more duty cycles of the second sync signal until the difference is within the first threshold or the duty cycles of the first and second sync signals are the same.

* * * * *